US012571335B2

(12) United States Patent
Kurp

(10) Patent No.: US 12,571,335 B2
(45) Date of Patent: Mar. 10, 2026

(54) DIESEL EXHAUST FLUID WITH ADDITIVE

(71) Applicant: JSIP, LLC, Conshohocken, PA (US)

(72) Inventor: Ronald D. Kurp, Shamong, NJ (US)

(73) Assignee: JSIP, LLC, Conshohocken, PA (US)

( * ) Notice: Subject to any disclaimer, the term of this patent is extended or adjusted under 35 U.S.C. 154(b) by 282 days.

(21) Appl. No.: 18/039,735

(22) PCT Filed: Dec. 6, 2021

(86) PCT No.: PCT/US2021/062028
§ 371 (c)(1),
(2) Date: Jun. 1, 2023

(87) PCT Pub. No.: WO2022/125449
PCT Pub. Date: Jun. 16, 2022

(65) Prior Publication Data

US 2025/0277465 A1 Sep. 4, 2025

Related U.S. Application Data

(60) Provisional application No. 63/123,098, filed on Dec. 9, 2020.

(51) Int. Cl.
*F01N 3/20* (2006.01)
*B01D 53/94* (2006.01)

(52) U.S. Cl.
CPC ....... *F01N 3/2073* (2013.01); *B01D 53/9418* (2013.01); *B01D 2251/2067* (2013.01); (Continued)

(58) Field of Classification Search
CPC ... F01N 3/2066; F01N 3/2073; F01N 2610/02
See application file for complete search history.

(56) References Cited

U.S. PATENT DOCUMENTS 7,914,682 B2 3/2011 Kurp
8,961,818 B2 2/2015 Ayyappan et al.
(Continued)

FOREIGN PATENT DOCUMENTS

EP 0975417 9/2005
EP 2144691 5/2015

OTHER PUBLICATIONS

Tischer et al., "Thermodynamics and reaction mechanism of urea decomposition", Phys., Chem, vol. 21, pp. 16785-16797, 2019.
(Continued)

*Primary Examiner* — Ngoc T Nguyen
(74) *Attorney, Agent, or Firm* — Stradley Ronon Stevens & Young, LLP

(57) ABSTRACT

A diesel exhaust fluid (DEF) for reducing nitrogen oxides in diesel exhaust streams while also reducing the deposition of urea and/or urea decomposition compounds in diesel exhaust systems of engines that use DEF and require selective catalytic reduction. The DEF has about 15 wt. % to about 40 wt % urea; substantially purified water; and a compound additive that generates water in the diesel exhaust streams at temperatures greater than 100° C., interferes with competing reactions that would otherwise prevent decomposition of urea or produce undesired decomposition deposit compounds including biuret, cyanuric acid, ammelide, ammeline, and melamine, or both generates water and interferes with the competing reactions. The compound additive is preferably a sugar, acetic acid, or ammonium acetate. Also disclosed are a related method of using the DEF in a diesel exhaust system and a system including the DEF as one component.

9 Claims, 12 Drawing Sheets

(52) U.S. Cl.
CPC .... *B01D 2251/21* (2013.01); *B01D 2258/012* (2013.01); *F01N 2610/02* (2013.01)

(56) References Cited

U.S. PATENT DOCUMENTS

| | | | |
|---|---|---|---|
| 8,999,277 | B2 | 4/2015 | Ayyappan et al. |
| 9,050,560 | B2 | 6/2015 | Wasow et al. |
| 2011/0233461 | A1 | 9/2011 | Wasow et al. |
| 2012/0252659 | A1 | 10/2012 | DiFrancesco |
| 2014/0369910 | A1 | 12/2014 | Ayyappan et al. |

OTHER PUBLICATIONS

Mutyal et al., "Analysis of the injection of urea-water-solution for automotive SCR systems: spray/exhaust-gas-interaction," ILASS-Europe 2014, 26th Annual Conference on Liquid Atomization and Spray Systems.
Birkhold et al., "Modeling and simulation of the injection of urea-water-solution for automotive SCR DeNOx-systems," Applied Catalysis B: Environmental, vol. 70, pp. 119-127, 2007.
Blue Def Platinum, DEF ISO 22241, buledef.com, 1 page, 2020.
Eakle et al., A proposal for AC AT-II, Advanced Combustion Catalyst and After Treatment Technologies, 53 pages, Submitted Apr. 2018.
International Search Report and Written Opinion in International Application No. PCT/US2021/062028 dated Mar. 31, 2022.
Def, Diesel Exhaust Fluid: ISO-22241-1 (published Feb. 2019, "the following:" and available at www.iso.org.

DIESEL EXHAUST FLUID WITH ADDITIVE

CROSS-REFERENCE TO RELATED APPLICATIONS

This application is a national phase filing of International Patent Application No. PCT/US2021/062028, filed on Dec. 6, 2021, which claims the benefit of priority to U.S. Provisional Patent Application Ser. No. 63/123,098, filed on Dec. 9, 2020, the contents of which are incorporated in this application by reference.

TECHNICAL FIELD

The present disclosure relates generally to formulations of diesel exhaust fluid (DEF) and, more particularly, to compositions, systems, and methods that reduce the accumulation of urea and/or urea decomposition compounds in diesel exhaust systems of engines that use DEF and require selective catalytic reduction.

BACKGROUND OF THE DISCLOSURE

Diesel engines are a preferred mechanism to produce torque for use in a wide range of applications including transportation, off-road agricultural and mining equipment, and the large-scale production of on-site electrical power. Their virtually unmatched power-to-mass ratios and the relative safety of their fuel make diesel engines almost the only choice for use in specific applications such as long-haul trucks, trains, tractors, earth movers, combines, surface mining equipment, non-electric locomotives, high capacity emergency power generators, and the like.

Diesel engines operate at high internal temperatures. One consequence of their high operating temperatures is that at least some of the nitrogen present in the engine at the moment of combustion may combine with oxygen to form nitrogen oxides ($NO_x$) including species such as NO and $NO_2$. Another consequence of the high operating temperatures is that diesel exhaust at or near the point of exit from the engine and into the exhaust pipe is very hot.

A compound such as $NO_x$ is problematic because it readily combines with volatile organic compounds in the atmosphere to form smog. $NO_x$ is regarded as a pollutant and virtually every industrialized nation regulates the levels of $NO_x$ that can be legally discharged into the atmosphere. The exhaust emissions regulations governing $NO_x$ are expected to become even more strict. Fortunately, engine and equipment manufacturers have developed methods, systems, and compositions for reducing the levels of $NO_x$ produced by the combustion of diesel fuel and released into the environment.

The favored method to reduce nitrogen oxides, protecting the environment and keeping the air quality as clean as possible, is selective catalytic reduction (SCR) using ammonia as a reducing agent. Although ammonia itself could be used in SCR as the reductant, ammonia is a volatile, corrosive, and poisonous substance. Given the related safety issues, automotive vehicles such as passenger cars cannot be equipped with an ammonia tank. It might also be possible to use ammonia in combination with urea as the reducing agent. That possibility is impractical, however, because the combination creates competing reactions that hamper $NO_x$ reduction and reduce SCR performance. Therefore, in general, a urea water solution (UWS) is widely used as the reducing agent in SCR and, more specifically, as an after-treatment for diesel engines. (The relatively high freezing point of urea in water solutions is problematic and has prompted consideration of nitrogen-based reductants which have lower freezing points than UWS; although such reductants can function, they offer inferior performance.) Urea is broken down (i.e., decomposes) through thermolysis and hydrolysis to ammonia and carbon dioxide when dosed by dispersion into the hot exhaust pipe. The ammonia produced can then act as the reductant.

The UWS is also known by the names AdBlue or diesel exhaust fluid (DEF). UWS formulations typically include about 32.5 wt. % urea and pure water. The quality of the UWS used as a $NO_x$ reducing agent in SCR converter systems must be specified to ensure reliable and stable operation of the SCR converter systems. Enter the International Organization for Standardization (ISO), a worldwide federation of national standards bodies. The ISO 22241 series provides the specifications for quality characteristics; for handling, transportation, and storage; and for the refilling interface as well as the test methods needed by the manufacturers of motor vehicles and their engines, by converter manufacturers, by producers and distributors of the UWS, and by fleet operators. More specifically, DEF, Diesel Exhaust Fluid: ISO-22241-1 (published February 2019 and available at www.iso.org) specifies the quality characteristics of the $NO_x$ reducing agent AUS 32 (aqueous urea solution) which is needed to operate SCR converter systems in motor vehicles with diesel engines.

During the desired decomposition of urea at temperatures above 130° C., undesired intermediates and by-products in liquid and solid form are produced and can stick to the wall of the exhaust pipe due to the inevitable interaction between the spray and the pipe wall. The urea deposits tend to form in the exhaust system especially between the DEF dosing inlet and upstream of the SCR catalyst. These deposits are mainly made up of cyanuric acid after the incomplete decomposition of urea (i.e., insufficient conversion to ammonia). The condensed urea deposits in the exhaust pipe can plug the pipe and create the risk of increased pressure drop.

Attempts have been made to reduce urea deposits in exhaust systems of engines that use DEF requiring SCR catalysts by modifying the DEF formulation. See, for example, U.S. Pat. Nos. 8,999,277 and 8,961,818 issued to Deere & Company of Illinois based on prior Patent Application Publication No. US 2014/0369910. Described are formulations of DEF that include low levels of formaldehyde, or other aldehydes including but not limited to acetaldehyde, propionaldehyde, or butyraldehyde.

Another modification of the DEF formulation that attempts to reduce urea deposits focused on minimizing the diameter of urea droplets. See U.S. Pat. No. 9,050,560 issued to Yara International ASA, a Norwegian chemical company, in 2015 based on prior Patent Application Publication No. US 2011/0233461. An even distribution of urea droplets with extraordinarily small diameters is achieved by influencing the spraying conditions by supplying an additive to the urea solution. Disclosed is a mixture of surfactants from alkylene oxide adducts with different degrees of alkoxylation. The mixture is used in a urea solution to be added to an exhaust stream for reduction of nitrous gases.

Old World Industries, LLC of Northbrook, Illinois offers a DEF product under the trademark "Blue DEF PLATINUM." The product is a mixture of high purity synthetic urea, deionized water, and a proprietary additive. Product advertising touts use of the product to reduce the formation of deposits that build up in diesel exhaust systems. It was reported that "lower" running temperatures of diesel engines experience this issue more frequently. Examples of such engines might include trash trucks, electrical generators, and other engines that often experience long periods of idling.

Given the problem of deposits in the exhaust pipe, the decomposition kinetics of urea and its by-products have been extensively studied by many authors. See, e.g., S. Tischer et al., "Thermodynamics and reaction mechanism of urea decomposition," *Phys. Chem. Chem. Phys., vol.* 21, pages 16785-97 (2019) (focuses on a reaction scheme for the formation and decomposition of undesired by-products deposited in the exhaust pipe that emphasizes the role of thermodynamic equilibrium of the reactants in liquid and solid phases); J. Mutyal et al., "Analysis of the injection of urea-water-solution for automotive SCR systems: spray/exhaust-gas-interaction," ILASS-Europe 2014, 26th Annual Conference on Liquid Atomization and Spray Systems (Bremen, Germany Sep. 8-10, 2014) (focuses on evaporation and mixing modeling of the UWS); and F. Birkhold et al., "Modeling and simulation of the injection of urea-water-solution for automotive SCR $DeNO_x$-systems," *Applied Catalysis B: Environmental, vol.* 70, pages 119-27 (2007) (investigates theoretically the evaporation of water from a single droplet of UWS).

Despite these studies and the many attempts made to reduce urea deposits in exhaust systems of engines that use DEF requiring SCR catalysts, much work remains to be done. An outline of that work is provided by the Southwest Research Institute (SwRI) in its Proposal No. 03-83490 titled "A Proposal for $AC^2AT$-II/Advanced Combustion Catalyst And Aftertreatment Technologies" (April 2018). The present document seeks to further that work.

With ever tighter limits on the amount of nitrogen oxide compounds that can be released into the atmosphere, there remains a need for improved methods, systems, and compositions for reducing the levels of $NO_x$. Therefore, an object of this disclosure is, and it would be a great advantage, to provide a UWS that better reduces the amount of nitrogen oxides in exhaust gases by SCR. Related objects are to facilitate urea decomposition, avoid deposition of urea and its decomposition by-products on exhaust pipe walls, and increase the efficiency of $NO_x$ reduction by SCR. Another object of the present disclosure is to reduce particulate emissions in diesel exhausts. Yet another object is to reduce particulate matters and nitrogen oxide emissions effectively with minimum fuel economy penalty.

SUMMARY OF THE DISCLOSURE

In view of these and other objects, to meet these and other needs, and in view of its purposes, the present disclosure provides a diesel exhaust fluid (DEF) for reducing nitrogen oxides in diesel exhaust streams while also reducing the deposition of urea and/or urea decomposition compounds in diesel exhaust systems of engines that use DEF and require selective catalytic reduction. The DEF has about 15 wt. % to about 40 wt % urea; substantially purified water; and a compound additive that generates water in the diesel exhaust streams at temperatures greater than 100° C. (or 125° C. or 150° C.), interferes with competing reactions that would otherwise prevent decomposition of urea or produce undesired decomposition deposit compounds including biuret, cyanuric acid, ammelide, ammeline, and melamine, or both generates water and interferes with the competing reactions. The compound additive is preferably a sugar, acetic acid, or ammonium acetate. Also disclosed are a related method of using the DEF in a diesel exhaust system and a system including the DEF as one component.

It is to be understood that both the foregoing general description and the following detailed description are exemplary, but are not restrictive, of the disclosure.

BRIEF DESCRIPTION OF THE DRAWING

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE DISCLOSURE

Figure 1:
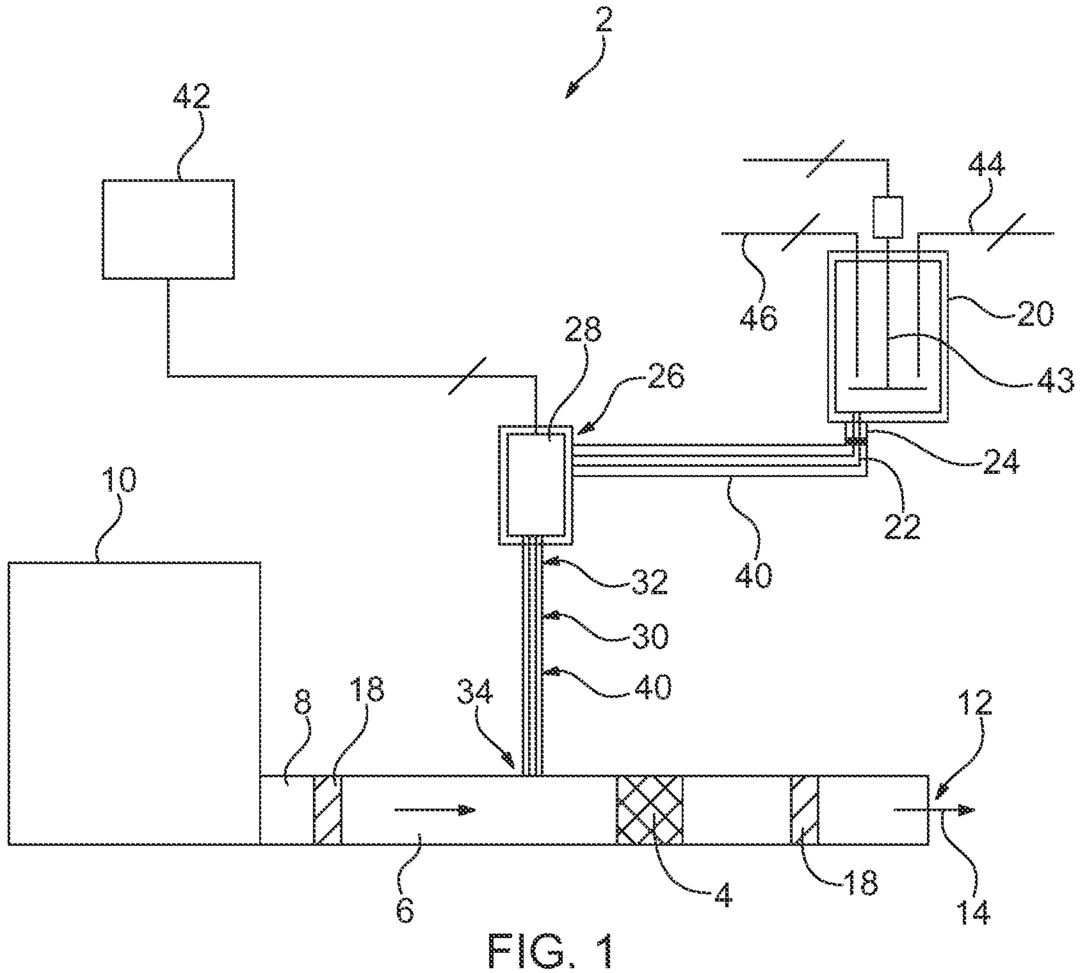
FIG. 1 is a schematic diagram of a typical heavy-duty diesel exhaust SCR treatment system.

In this specification and in the claims that follow, reference will be made to a number of terms which shall be defined to have the following meanings ascribed to them.

"Include," "includes," "including," "have," "has," "having," comprise," "comprises," "comprising," or like terms mean encompassing but not limited to, that is, inclusive and not exclusive. The indefinite article "a" or "an" and its corresponding definite article "the" as used in this disclosure means at least one, or one or more, unless specified otherwise.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is described to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point. Whether or not a numerical value or end-point of a range in the specification recites "about," the numerical value or end-point of a range is intended to include two embodiments: one modified by "about" and one not modified by "about." It will be further understood that the end-points of each of the ranges are significant both in relation to the other end-point and independently of the other end-point.

The term "about" further references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described.

Currently available technology used to reduce the amount of nitrogen oxide ($NO_x$) emissions that are emitted in diesel exhaust streams includes selective catalytic reduction (SCR). This technology is widely used to reduce $NO_x$ emissions from heavy duty diesel engines and takes advantage of the high temperatures found in diesel exhaust streams. In a typical SCR-based exhaust treatment system, a SCR catalyst is positioned in the exhaust stream of a diesel engine. The catalyst is positioned such that the temperature of the exhaust streams contacting the surface of the catalyst is high enough to sustain the reaction of the $NO_x$ in the exhaust streams with the reductant but not so high that the heat produced by the engine and the chemical reactions that take place in the exhaust stream damages the catalyst.

Referring now to the drawing, FIG. 1 is a schematic diagram of a typical heavy-duty diesel exhaust treatment SCR system 2. A SCR catalyst 4 is positioned within an exhaust pipe 6. The exhaust pipe 6 has two ends. One end 8 is connected to a source 10 of $NO_x$ and the other end 12 is vented to the atmosphere in the direction of an arrow 14. A typical system 2 may also include, optionally, an additional pair of catalysts 16 and 18 are positioned before (catalyst 16) and after (catalyst 18) the SCR catalyst 4. The oxidation catalysts function to catalyze the oxidation of various compounds in the exhaust stream including organic molecules and un-reacted ammonia.

Because the SCR system 2 requires a reductant such as ammonia or urea, the SCR system 2 includes a mechanism for storing and delivering the reductant to the catalyst. Still referring to FIG. 1, a reductant storage vessel 20 is connected to a first delivery tube 22. The first delivery tube 22 has an inlet 24 connected to the storage vessel 20 and an outlet 26 connected to a reductant delivery valve 28 that regulates the flow of the reductant from the first delivery tube 22 to a second delivery tube 30. The second delivery tube 30 also has an inlet 32 connected to the outlet of the valve 28 and an outlet 34 connected to the exhaust pipe 6. The outlet 34 of the second delivery tube 30 is connected to the exhaust pipe 6 such that the reductant in the second delivery tube 30 is delivered onto or near the surface of the SCR catalyst 4 by the outlet 34.

In some embodiments, the SCR system 2 may include a device for maintaining the temperature of the reductant in the storage vessel 20. In some configurations, the first reductant delivery tube 22, the reductant delivery valve 28, and/or the second reductant delivery tube 30 may include a device 40 to help regulate the temperature of the reductant in the system 2. In some embodiments, the device 40 is selected from the group consisting of insulation, a heating coil or sock, a cooling or warming jacket, or some combination of them.

In some embodiments, the SCR system 2 further includes an optional mixer 43 supplied to either periodically or continuously agitate the contents of the reductant storage vessel 20. The vessel 20 may also be equipped with a temperature sensor 44 to measure the temperature of the contents of the vessel 20. The vessel 20 may also have a probe 46 for measuring the nitrogen content of the material stored in the vessel 20. In some embodiments, the SCR system 2 may have a controller 42 which may include inputs from sensors connected to the exhaust and/or the SCR system 2.

The controller 42 has a central processing unit (CPU) or dedicated logic circuits that regulate the dispersion of reductant to the system 2 as necessary to maintain the release of $NO_x$ within acceptable limits. The controller 42 can monitor the temperature of the reductant delivery system and perhaps control portions of the system 2 dedicated to maintaining the reductant within an acceptable temperature range. In some embodiments, the same controller 42 is used to regulate the rate, frequency, or both of the mixer 43 associated with the reductant storage vessel 20. In some embodiments, the controller 42 monitors the level of reductant, the composition of the reductant, or both the level and the composition of the reductant in the reductant storage vessel 20.

The problem of urea deposition in the SCR system 2 can cause reduced fuel efficiency, particulate filter failure, damage to the SCR catalyst bed, and even engine failure as a significant build-up of urea in the exhaust system can cause excessive back pressure. The SCR system 2 is equipped optionally with pressure sensors, in part to detect the effects of urea deposition. These sensors are part of a monitoring unit that enables the diesel operator to detect problematic urea buildup and to take appropriate action such as shutting down the SCR system 2 until the deposits can be physically removed from the SCR system 2. Still other systematic approaches to addressing the problem of urea build-up are to alter the position of the DEF feed tube and to time the release of DEF into a portion of the SCR system 2 immediately up-stream of the SCR catalytic bed in order to minimize the time that urea-rich DEF is in contact with the DEF feed system and pre-SCR section of the SCR system 2.

Figure 2:
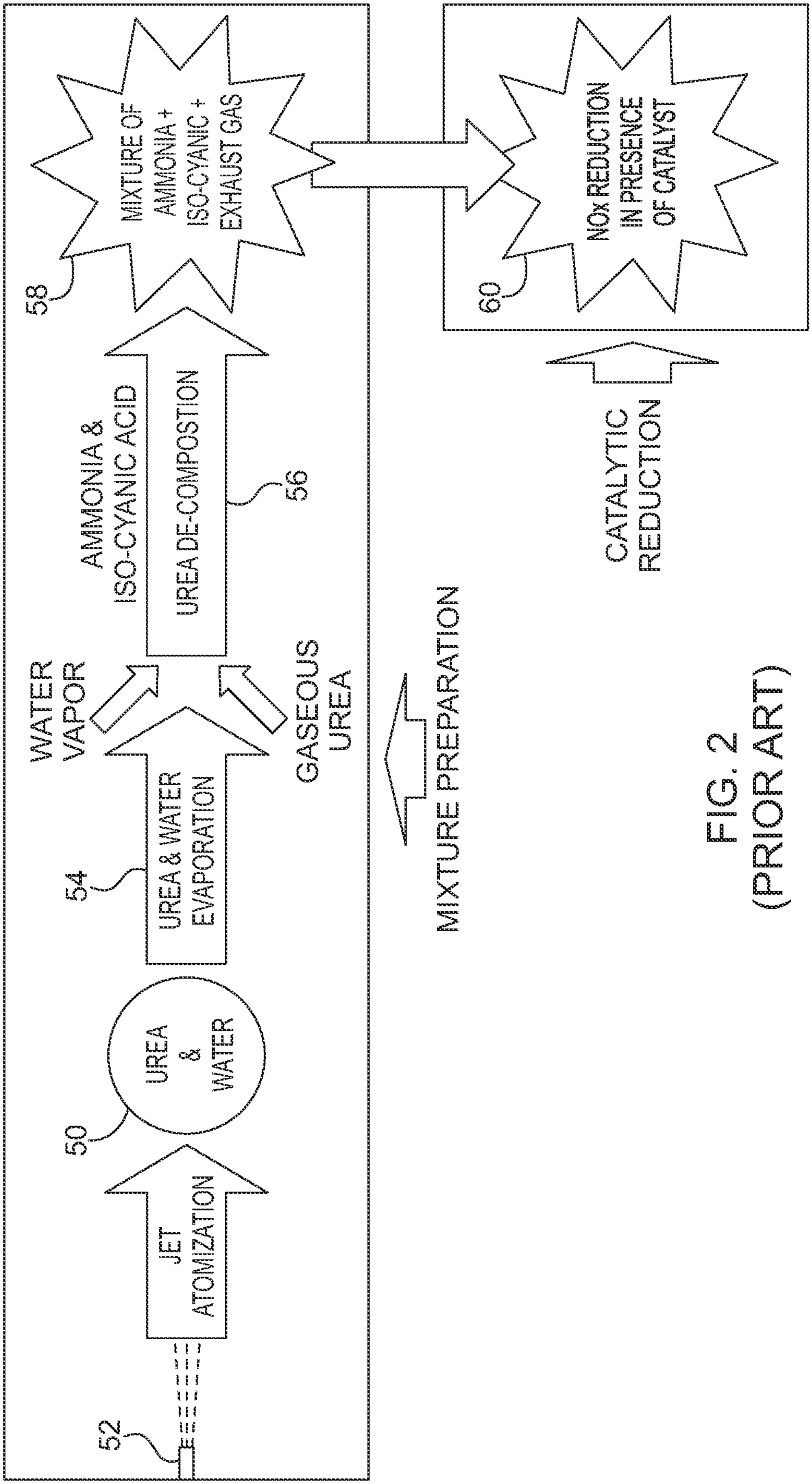
FIG. 2 is a schematic diagram showing mixture preparation and the catalytic reduction process in the SCR system.

FIG. 2 is a schematic diagram showing mixture preparation and the catalytic reduction process in the SCR system 2. The UWS 50 (typically a 32.5% wt. solution of urea in water) is injected (i.e., sprayed) as the reductant into the hot exhaust gas stream and undergoes atomization. The UWS is atomized with the help of a narrow nozzle 52. The diameter of the droplets should be very small to achieve a high temperature in a short time in the exhaust gas stream, thus leading to a thorough hydrolysis of the urea. Bigger droplets may stick to the wall of the exhaust pipe or material of the catalyst if the droplets are not evenly distributed. In this case the water evaporates quickly in the hot exhaust stream and other reactions will take place.

When UWS is atomized into the hot exhaust gas stream, the droplets are heated and, due to the low vapor pressure of urea compared to the vapor pressure of water, water evaporates first from the droplets. The subsequent generation of ammonia ($NH_3$) in the hot exhaust gas proceeds in three steps, as follows.

(1) The water component is first released from the liquid UWS by vaporization. Vaporization or evaporation 54 of water from a fine spray of UWS droplets proceeds according to the equation: $(NH_2)_2CO$ (aqueous)→ $(NH_2)_2CO$ (solid or liquid)+$6.9H_2O$ (gas).

(2) After water vaporization, the remaining urea starts to decompose 56 at higher temperature. Urea starts melting at 133° C. (or 406 K because the conversion of Kelvin to Celsius is K=° C.+273) and the thermal decomposition of urea into ammonia and isocyanic acid starts. Vigorous decomposition starts at approximately 140° C. (413 K). Thermolysis becomes fully evident above 152° C. (425 K). Urea thermolysis and formation of ammonia and isocyanic acid 58 proceed according to the equation: $(NH_2)_2CO$ (solid or liquid)→$(HN_3)$ (gas)+HNCO (gas). Although this equation is a single-step and rather simplistic description of the decomposition of urea, formation of polymeric compounds including biuret, cyanuric acid, ammelide, ammeline, and melamine is observed during the urea decomposition reaction.

(3) Finally, the hydrolysis of isocyanic acid proceeds at higher temperature to generate ammonia according to the equation: HNCO (gas)+$H_2O$ (gas)→$(NH_3)$ (gas)+$CO_2$ (gas).

The ammonia that is generated in the hot exhaust gas reacts with $NO_x$ in the presence of a catalyst 60 to produce nitrogen and water. Some of the reactions that occur on the surface of the SCR catalyst in SCR-based exhaust treatment systems include the following:

$$4NH_3+4NO+O_2\rightarrow 4N_2+6H_2O;$$

$$2NH_3+NO+NO_2\rightarrow 2N_2+3\ H_2O;\ \text{and}$$

$$8NH_3+6NO_2\rightarrow 7N_2+12H_2O.$$

Thus, typical chemical reactions facilitated by SCR catalysts are the reduction of $NO_x$ such as $NO_2$ or NO to $N_2$ and $H_2O$.

As stated above, one significant limitation of SCR systems is deposit formation as a result of incomplete urea decomposition. When isocyanic acid (HNCO) undergoes reactions other than hydrolysis, deposit formation commences. Some of these reactions are illustrated as follows:

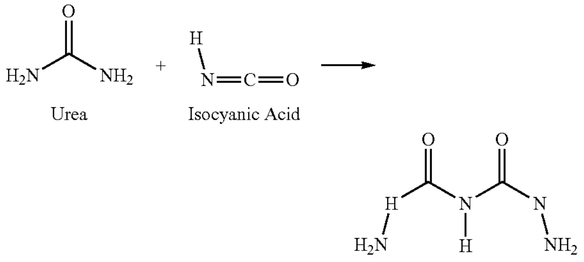

Urea Isocyanic Acid

Biuret

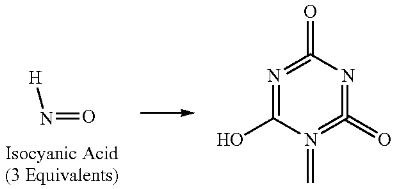

Isocyanic Acid (3 Equivalents)

Cyanuric Acid

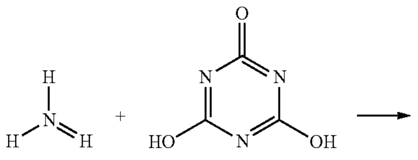

Ammonia Cyanuric Acid

-continued

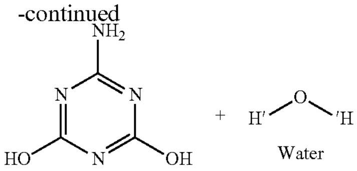

Ammelide Water

The urea-derived deposits consist of various molecular species such as biuret, cyanuric acid, ammeline, melamine, and ammelide—among others.

The present disclosure relates to a method, system, and composition for reducing the deposition of urea and related by-products in the exhaust systems of engines that use DEF and require SCR. A basis for the disclosure is the recognition that, after completion of the three steps listed above by which ammonia is generated in the hot exhaust gas, insufficient water may be present at the urea decomposition temperatures to facilitate the reactions necessary to complete urea decomposition. For example, biuret can be hydrolyzed to $NH_3$ and $CO_2$. That hydrolysis reaction will not take place in practice, however, given the lack of water in the dried UWS droplets. Instead, a detrimental melamine deposit is formed in an alternative reaction. This recognition is supported in the published research, outlined above, that reviews the thermodynamics and reaction mechanisms of urea decomposition and urea $DeNO_x$.

Having recognized the problem, the present disclosure provides a method, system, and composition that generate water in the DEF environment in which the relevant chemical reactions occur (e.g., at temperatures greater than 100° C. (373 K) or 125° C. (398 K) or 150° C. (423 K)); interfere with the competing reactions that would otherwise produce undesired deposit compounds such as melamine; or both. Contemplated is the addition of a compound (i.e., an additive) to the DEF. Any compound addition to DEF must be non-hazardous during production, transport, and storage; while in the solution; and after being oxidized in an exhaust system.

The DEF according to the present disclosure begins with pure urea. Technically pure urea is an industrially produced grade of urea (CAS Number 57-13-6) with only traces of biuret, ammonia, and water, free of aldehydes or other substances such as anticaking agent, and free of contaminants such as sulfur and its compounds, chloride, nitrate, or other compounds. The physical properties of urea include a density of 1,280 kg/$m^3$; a specific heat of 2,375 j/kg-k; a vaporization temperature of 147° C. (420 K); and a boiling temperature of 210° C. (483 K).

Water is added to the urea to create a UWS. Typically, the UWS includes on the order of about 15 wt. % to about 40 wt % (preferably about 32.5 wt. %) urea and substantially purified (e.g., demineralized or deionized) water. The compound addition is included in the UWS to create the final DEF composition ready for use in the intended application. The final DEF composition can be tailored or predetermined to best reduce the deposition of urea and related by-products in the exhaust systems of specific engine applications. By “predetermined” is meant determined beforehand, so that the predetermined characteristic (composition) must be determined, i.e., chosen or at least known, in advance of some event (use in the exhaust system).

The DEF composition is optimized to prolong catalyst life and to include extremely low levels of impurities that can cause deposits or poison expensive SCR catalysts. U.S. Pat.

No. 7,914,682 issued to Colonial Chemical Company of New Jersey and is incorporated into this document by reference in its entirety. The '682 patent discloses a method of, and a system for, removing impurities from a urea solution. The method and system involve contacting the aqueous solution with an ion exchange resin and adsorbing the impurities from the urea solution. Optionally, the method and system can be applied to the DEF composition of the present disclosure. Accordingly, the DEF compositions disclosed in this document have virtually undetectable levels of sulfur, metals, noncombustible fillers, other inert contaminants, and compounds whose effects on SCR catalyst life are unknown. As one example, the DEF composition includes about 0.0010 wt. % formaldehyde; less than 0.6 ppm of phosphates, calcium, iron, aluminum, magnesium, sodium, and potassium; and less than 0.3 ppm copper, zinc, chromium, and nickel.

The additive can be included as part of DEF production solutions or as a separate "additive" product. In either case, the additive reduces the accumulation of urea and/or urea decomposition compounds in diesel exhaust systems. The DEF composition including the additive is spray injected into the gas stream of an application (e.g., automotive). The spray typically has a Sauter mean diameter of about 20-150 μm, an exit velocity of about 5-25 m/s, and an injection temperature of about 27-77° C. (300-350 K). The exhaust velocity is typically about 5-100 m/s at a temperature of about 127°-727C (400-1,000 K). The temperature of the wall of the exhaust pipe is about 77-627° C. (350-900 K).

EXAMPLES

The following examples are included to more clearly demonstrate the overall nature of the disclosure. These examples are exemplary, not restrictive, of the disclosure.

One suitable DEF compound additive is sugar. The term "sugar" includes a crystalline group of soluble carbohydrates. Sugar molecules include glucose (or dextrose), fructose, galactose, lactose, sucrose, and maltose. Sugar molecules are classified as monosaccharides or disaccharides. The following Table 1 lists the common sugar molecules and their chemical formulas.

TABLE 1

Sugar Molecules

| Sugar Type | Name | Chemical Formula |
|---|---|---|
| Monosaccharide | Glucose | $C_6H_{12}O_6$ |
| Monosaccharide | Fructose | $C_6H_{12}O_6$ |
| Monosaccharide | Galactose | $C_6H_{12}O_6$ |
| Disaccharide (glucose + galactose) | Lactose | $C_{12}H_{22}O_{11}$ |
| Disaccharide (glucose + fructose) | Sucrose | $C_{12}H_{22}O_{11}$ |
| Disaccharide (glucose + glucose) | Maltose | $C_{12}H_{22}O_{11}$ |

A monosaccharide is the smallest unit of sugar ("mono" meaning one). A disaccharide is a sugar that is made up of two sugar units ("di" meaning two). The monosaccharides glucose, fructose, and galactose all have the same molecular formula, but they vary in their molecular structure. Similarly, the disaccharides lactose, sucrose, and maltose also have the same molecular formula but differ in their molecular structure. Dextrose is a simple sugar that is derived from corn but, chemically, is identical to glucose.

Initial tests focused on sucrose. The decomposition temperature of sucrose is approximately 186° C. (459 K). The compounds produced upon decomposition are carbon dioxide and water according to the chemical equation: $C_{12}H_{22}O_{11}+12O_{2\rightarrow 12}CO_2+11H_2O$.

Several qualitative tests were performed with various ratios of urea and sucrose in the DEF. The DEF samples were heated in test tubes (25×150 mm) with a propane torch and observed as compared to urea samples only. The conclusion of these tests was that it appeared that releasing water at higher temperatures by decomposition of the sucrose helped in the decomposition of the urea by a visual reduction of the residue in the tube as compared to samples of urea without sucrose being added. Moreover, the residue buildup was reduced significantly if not eliminated.

In one particular test, calculations were made using the equations of the three steps listed above. Molecular weights are listed in parenthesis (in units of g/mol); amounts are listed in brackets.

$$(NH_2)_2CO(60.056)\rightarrow(NH_2)_2CO(60.056)+6.9H_2O; \quad (1)$$

$$(NH_2)_2CO\ (60.056)\rightarrow(HN_3)(17.031)+HNCO(43.03) \quad (2)$$

[ammonia=28.35%/isocyanic acid=71.65%]; and $$HNCO(43.03)+H_2O(18.01)\rightarrow(NH_3)(17.03)+CO_2(44.01) \quad (3)$$

[acid=70.5%/Water=29.5%] [ammonia=27.9%/carbon dioxide=72.1%].

The addition of sucrose, having a molecular weight of 342.3 g/mol, prompted calculation based on the equation listed above:

$$C_{12}H_{22}O_{11}+12O_2\rightarrow 12CO_2+11H_2O \quad (4)$$

[sucrose=47.1%/oxygen=52.9%] [carbon dioxide=72.7%/water=27.3%].

For 0.5 g of urea, 0.15 g of water is needed to react with isocyanic acid. Calculations indicate that 0.26 g of sucrose are needed per 0.5 g of urea. Therefore, 0.5 g of urea and 0.26 g of sucrose were heated to a maximum of 200° C. (473 K). No residue was observed either on the thermocouple or on the sides of the test tube (although a high carbon content existed).

Similar tests were performed with other related sugar compounds such as glucose, fructose, and dextrose. These tests generated similar observable results. Various ratios of the sugar to urea were evaluated as compared to the theoretical amount of water generated. Further investigation on the decomposition of sugars was done for decomposition temperatures and decomposition products generated at the expected diesel exhaust temperatures.

Further contemplated is the use of a compound additive to the DEF containing fewer carbon atoms than sugars. Acetic acid has a molecular formula of $HC_2H_3O_2$ (or $C_2H_4O_2$ or $CH_3COOH$ or $CH_3CO_2H$) and a molecular weight of 60.05 g/mol. Classified as a weak acid because it only partially dissociates in solution, acetic acid is a simple carboxylic acid and consists of a methyl group attached to a carboxyl group. Acetic acid was tested in a test tube with urea and heated with a propane torch. Complete decomposition of acetic acid proceeds according to the chemical equation $HC_2H_3O_2+2O_2\rightarrow 2H_2O+2CO_2$. Very favorable results were observed and there was less carbon residue at the lower temperatures than for sugar additives.

Still further contemplated is the use of ammonium acetate as a compound additive to the DEF. Ammonium acetate is a chemical compound with the formula $NH_4CH_3CO_2$ and a molecular weight of 77.08 g/mol. It is a white, hygroscopic solid with a melting point of 114° C. (387 K) and can be derived from the reaction of ammonia and acetic acid. DEF solutions typically contain a small amount of ammonia when produced and stored. Acetic acid and ammonia would form the equivalent of an ammonium acetate crystal. Complete decomposition of ammonium acetate proceeds according to the chemical equation $NH_4CH_3CO_2+2O_2\rightarrow 2CO_2+2H_2O+NH_3$. This addition could also potentially benefit the DEF solution by generating a buffer system to reduce the degradation of DEF in storage.

Thus, additions of some of the compounds tested and contemplated above could benefit the storage stability of the DEF solution before use of that solution. The compound additives also seemed to improve heat transfer and to melt solid urea more quickly than conventional additives. The compound additives would not be hazardous during production, transport, and storage; while in the DEF solution; or after being oxidized in an exhaust system.

Thermogravimetric analysis or thermal gravimetric analysis (TGA) is a method of thermal analysis in which the mass of a sample is measured over time as the temperature changes. This measurement provides information about physical phenomena, such as phase transitions, absorption, adsorption and desorption; as well as chemical phenomena including chemisorptions, thermal decomposition, and solid-gas reactions (e.g., oxidation or reduction). TGA is conducted on an instrument referred to as a thermogravimetric analyzer. A thermogravimetric analyzer continuously measures mass while the temperature of a sample is changed over time. Mass, temperature, and time are considered base measurements in TGA while many additional measures may be derived from these three base measurements.

Five samples of DEF made according to the present disclosure were prepared for TGA. The samples were prepared by producing a "base" large control sample of 32.5% urea solution, pulling aliquots from that sample, and making the weight percent additions for each, as listed in Table 2. Control Sample 1 is 32.5% urea made according to the U.S. Pharmacopeia (USP) Reference Standard; therefore, the USP urea solution is a pharmaceutical-grade solution.

The two additive compounds are based on the preliminary test tube tests previously conducted. Sucrose, the "higher carbon content additive," is representative of the sugar-type compounds, releasing water at decomposition temperatures. Ammonium acetate was selected to represent the "lower carbon content type" compounds that also releases water at decomposition temperatures.

Samples designated both "L" (low) and "H" (high) were prepared for TGA testing, indicating the weight-percent additions of the additive, to provide data to indicate the effect on the 32.5% urea liquor. The "L" or low concentration is based on visual observations of the test tube testing for each additive versus the control 32.5% urea sample. The "H" or high concentration is based on the stoichiometry of the theoretical decomposition of urea and theoretical decomposition of the additives. Although the theoretical weight percent of sucrose was determined to be 16.83% for 32.5% urea, an addition of 10% was selected because significant carbon residues from the higher concentrations were observed.

The information for the samples provided is shown in Table 2.

TABLE 2

DEF Sample Information

| Sample No. | Sample Description | TGA Sample No. |
|---|---|---|
| 1-Control | DEF Control 32.50% Urea Solution (USP) | TCL1 3914 |
| 2-S-L | 32.5% Urea Solution + 0.02% Sucrose | TCL1 3915 |
| 3-S-H | 32.5% Urea Solution + 10.00% Sucrose | TCL1 3916 |
| 4-A-L | 32.5% Urea Solution + 0.50% Ammonium Acetate | TCL1 3917 |
| 5-A-H | 32.5% Urea Solution + 20.00% Ammonium Acetate | TCL1 3918 |

Thus, the range of sucrose found to be suitable in a 32.5% urea solution was from about 0.02% to about 10.00%. Certain narrower ranges of sucrose expected to be suitable in a 32.5% urea solution to achieve desired results include from about 0.20% to about 8.00%; from about 0.20% to about 6.00%; from about 0.20% to about 4.00%; from about 0.20% to about 2.00%; from about 1.00% to about 10.00%; from about 1.00% to about 8.00%; from about 1.00% to about 6.00%; from about 1.00% to about 4.00%; from about 1.00% to about 2.00%; from about 2.00% to about 10.00%; from about 2.00% to about 8.00%; from about 2.00% to about 6.00%; from about 2.00% to about 4.00%; from about 4.00% to about 10.00%; from about 4.00% to about 8.00%; from about 4.00% to about 6.00%; from about 6.00% to about 10.00%; from about 6.00% to about 8.00%; and from about 8.00% to about 10.00%. The range of ammonium acetate found to be suitable in a 32.5% urea solution was from about 0.50% to about 20.00%. Certain narrower ranges of ammonium acetate expected to be suitable in a 32.5% urea solution to achieve desired results include from about 0.50% to about 15.00%; from about 0.50% to about 10.00%; from about 0.50% to about 5.00%; from about 1.00% to about 20.00%; from about 1.00% to about 15.00%; from about 1.00% to about 10.00%; from about 1.00% to about 5.00%; from about 5.00% to about 20.00%; from about 5.00% to about 15.00%; from about 5.00% to about 10.00%; from about 10.00% to about 20.00%; from about 10.00% to about 15.00%; and from about 15.00% to about 20.00%.

The purpose of this testing is to indicate if the weight percent loss of the samples containing the additives is greater than the control sample. The temperatures of most interest are between 100 and 300° C. where the accumulation of residues have been experienced. The TGA filenames for the samples are given in Table 3. Overlays of the TGA curves for each sample with the control are presented in order of ascending TGA sample number in FIGS. 3 through 6, respectively. The data for all four samples are overlaid with the data for the control in FIG. 7.

TABLE 3

DEF TGA Information

| Sample Description | Sample Number | TGA Filename |
|---|---|---|
| DEF 1-Control 32.5% Urea Solution, USP | TCL1 3914 | TG3.1399 |
| 2-S-L | TCL1 3915 | TG3.1417 |
| 3-S-H | TCL1 3916 | TG3.1413 |

TABLE 3-continued

DEF TGA Information

| Sample Description | Sample Number | TGA Filename |
|---|---|---|
| 4-A-L | TCL1 3917 | TG3.1445 |
| 5-A-H | TCL1 3918 | TG3.1415 |

TGA was performed using a TA Instruments Discovery 5500 TGA instrument. For the analyses, approximately 8 to 26 mg of the samples were loaded onto tared platinum sample pans. The air purge was about 10 mL per minute at the balance and about 100 mL per minute at the furnace. The ramp profile used was as follows:

Equilibrate at 40° C.
Ramp 10° C./min from 40 to 130° C.
Hold at 130° C. for 2 minutes
Ramp 10° C./min from 130 to 150° C.
Hold at 150° C. for 2 minutes
Ramp 10° C./min from 150 to 175° C.
Hold at 175° C. for 2 minutes
Ramp 10° C./min from 175 to 190° C.
Hold at 190° C. for 2 minutes
Ramp 10° C./min from 190 to 193° C.
Hold at 193° C. for 2 minutes
Ramp 10° C./min from 193 to 200° C.
Hold at 200° C. for 2 minutes
Ramp 10° C./min from 200 to 325° C.
Hold at 325° C. for 2 minutes
Ramp 10° C./min from 325 to 350° C.
Hold at 350° C. for 2 minutes
Ramp 10° C./min from 350 to 600° C.

For sample 4-A-L, approximately 2 mg of the sample was loaded onto a tared platinum pan. The sample was heated from ambient to 200° C. Tests were first run on this sample and the results were used to adjust the test methodology for the remaining samples.

The instrument was controlled with the TRIOS v. 5.0.0.44608 software and the data were analyzed using TRIOS v. 4.4.0.41128.

The temperature ramp used for four of the five samples subject to the TGA testing was primarily based on previously identified thermodynamics and the reaction mechanism of urea decomposition. See *Phys. Chem. Chem. Phys.*, vol. 21, pages 16785-97 (2019). The purpose was to review weight loss at the isotherm "hold" temperatures.

Figure 3:
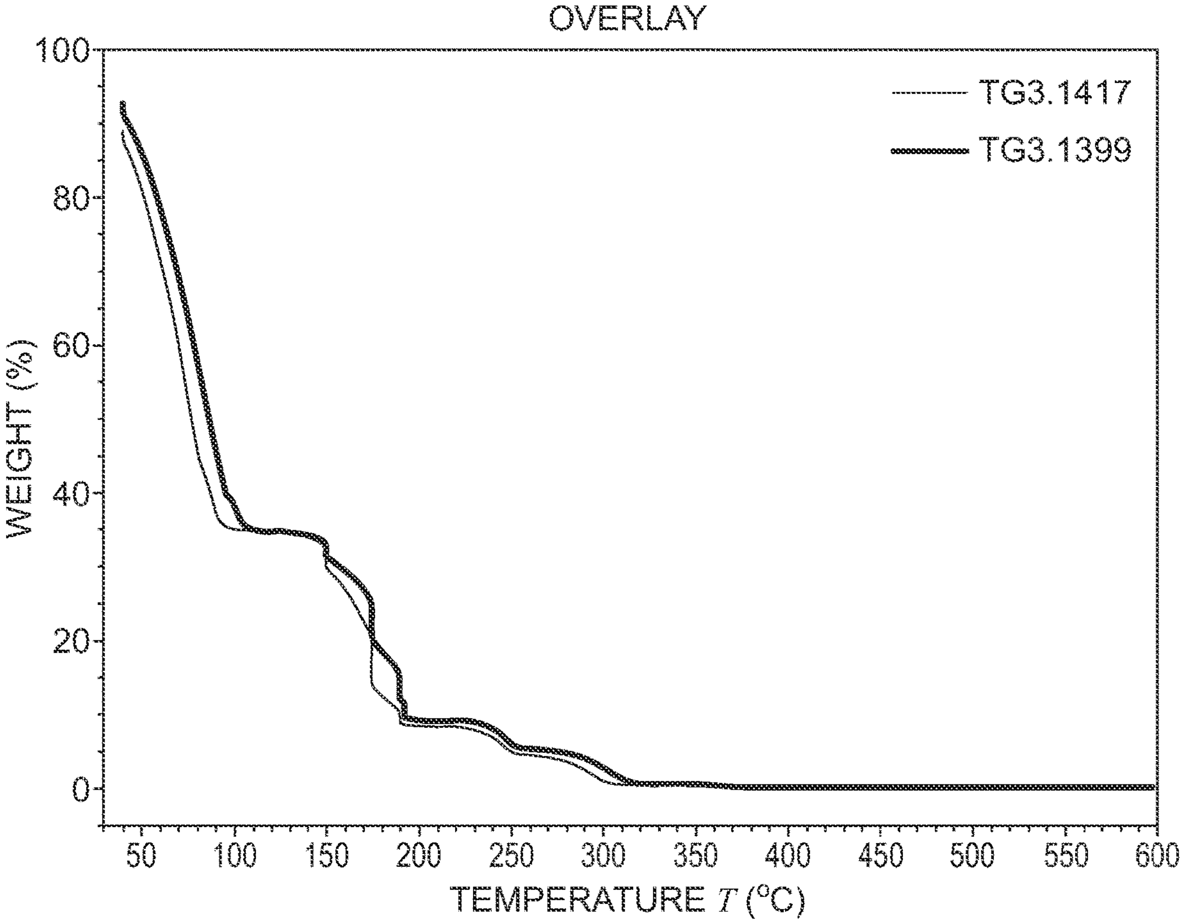
FIG. 3 shows the overlay of the TGA curves for DEF Sample 2-S-L and the control Sample 1.

FIG. 3 shows the overlay of the TGA curves for DEF Sample 2-S-L and the control Sample 1. The addition of sucrose at 0.02% favorably increased the weight percent loss at 150° C. to 300° C. tracking below the control sample.

Figure 4:
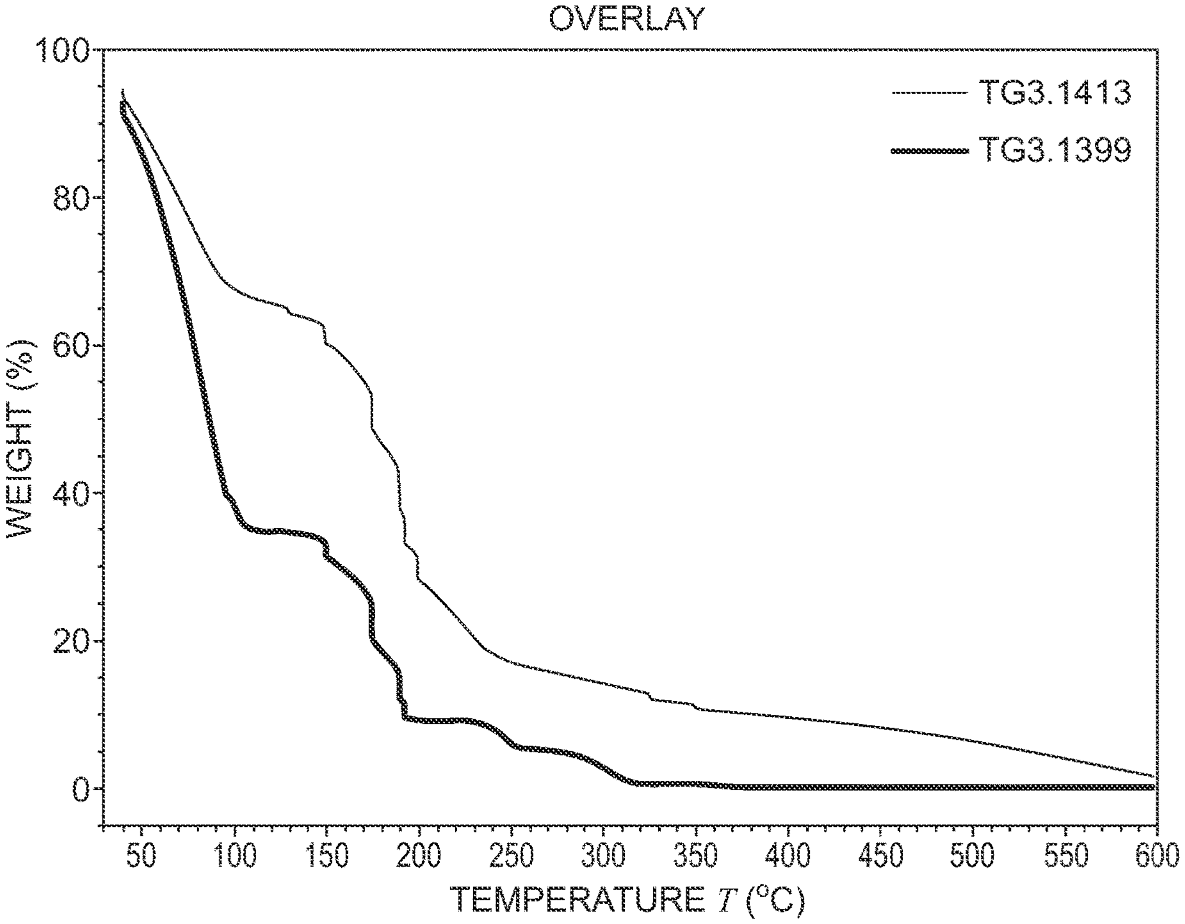
FIG. 4 shows the overlay of the TGA curves for DEF Sample 3-S-H and the control Sample 1.

FIG. 4 shows the overlay of the TGA curves for DEF Sample 3-S-H and the control Sample 1. The significant addition of sucrose at 10.00% appears to have resulted in the sample retaining water longer to 150° C. A significant weight percent loss from approximately 150° C. to 240° C. is noted. The increased rate of weight percent loss is also observed at 190° C. and at 200 to 240° C.

Figure 5:
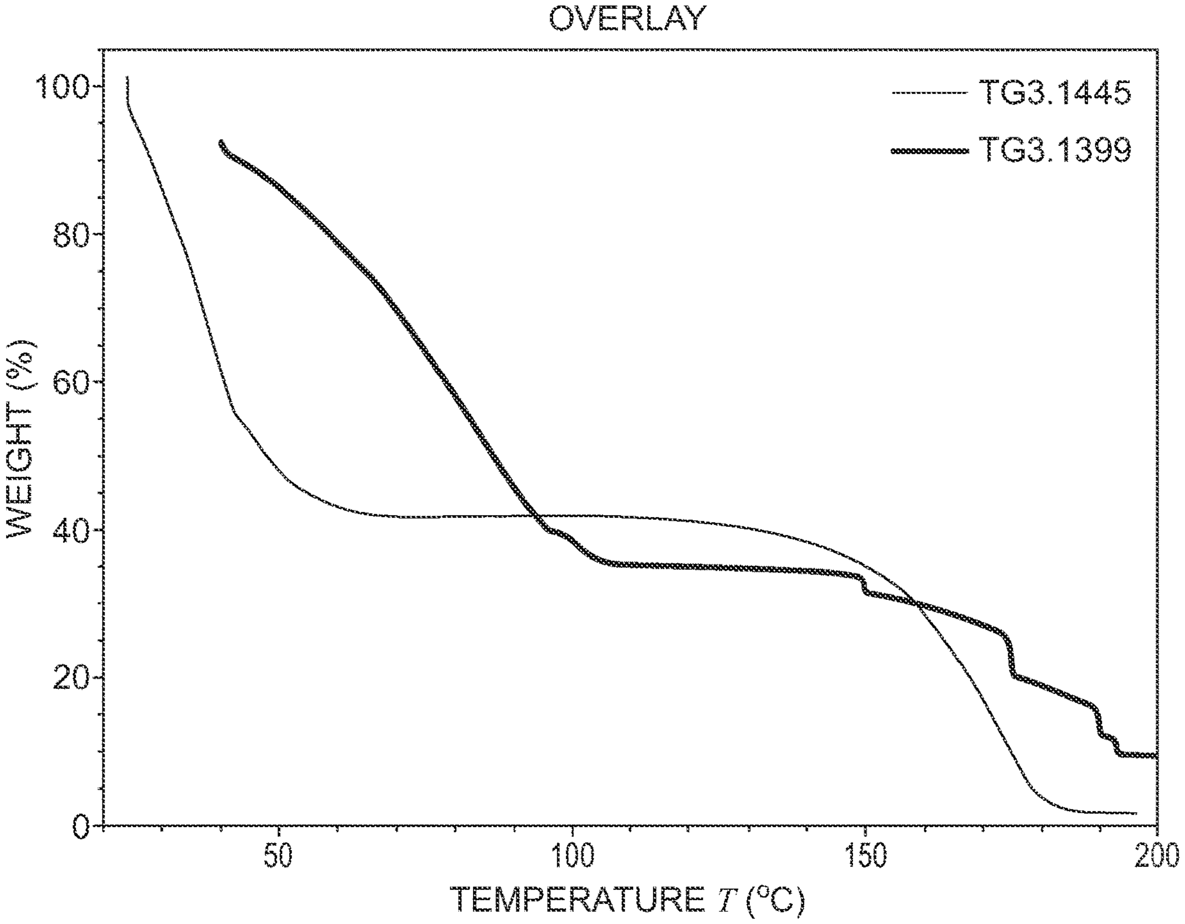
FIG. 5 shows the overlay of the TGA curves for DEF Sample 4-A-L and the control Sample 1.

FIG. 5 shows the overlay of the TGA curves for DEF Sample 4-A-L and the control Sample 1. This sample was tested using a slightly different method than the other samples. It was not held at 40° C. after the initial charge of the sample and there were no temperature isotherms through the temperature ramp. The addition of ammonium acetate at 0.50% resulted in a higher rate and more significant weight percent loss from 150° C. to near 200° C. versus the control.

Figure 6:
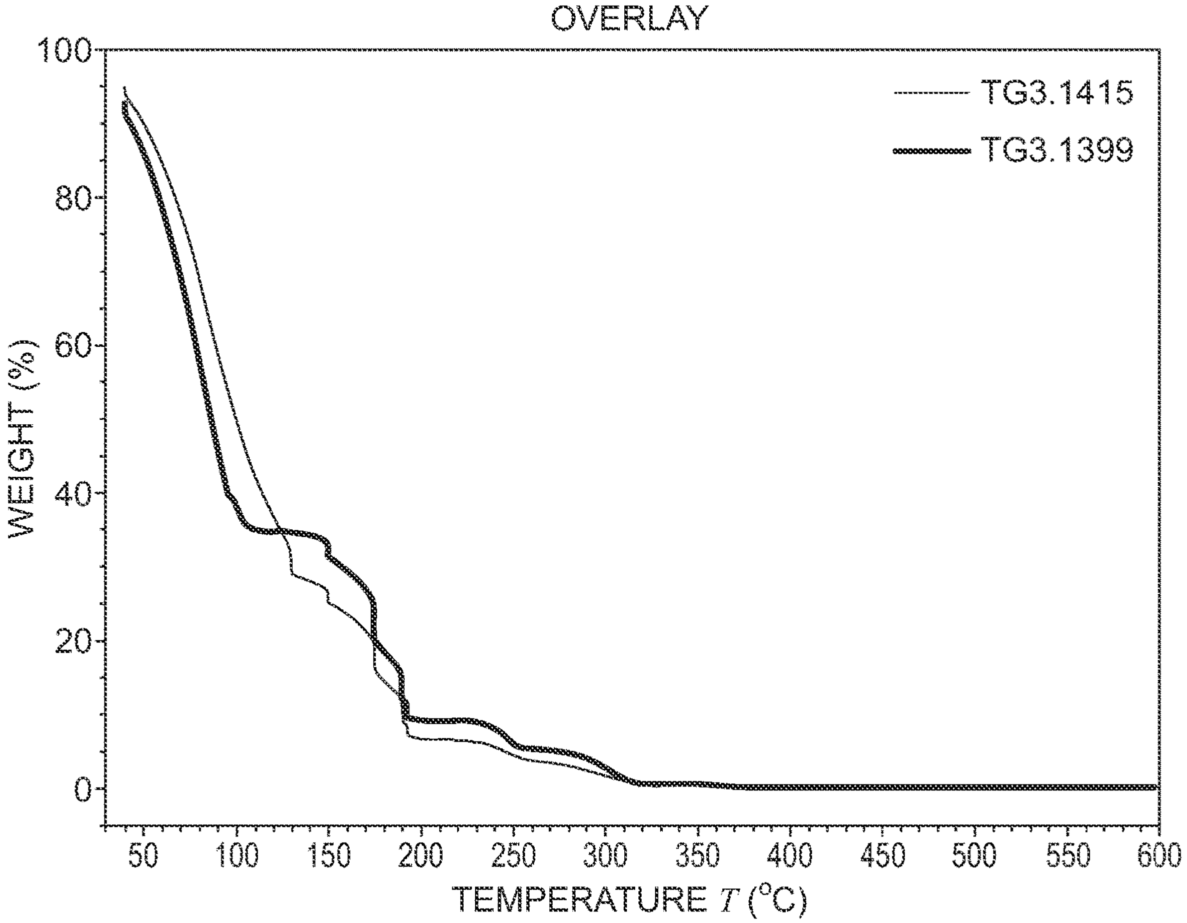
FIG. 6 shows the overlay of the TGA curves for DEF Sample 5-A-H and the control Sample 1.

FIG. 6 shows the overlay of the TGA curves for DEF Sample 5-A-H and the control Sample 1. The addition of ammonium acetate at 20.00% tracks lower in weight percent than the control from 130° C. to 310° C. even though the mass content for Sample 5 is significantly higher.

Figure 7:
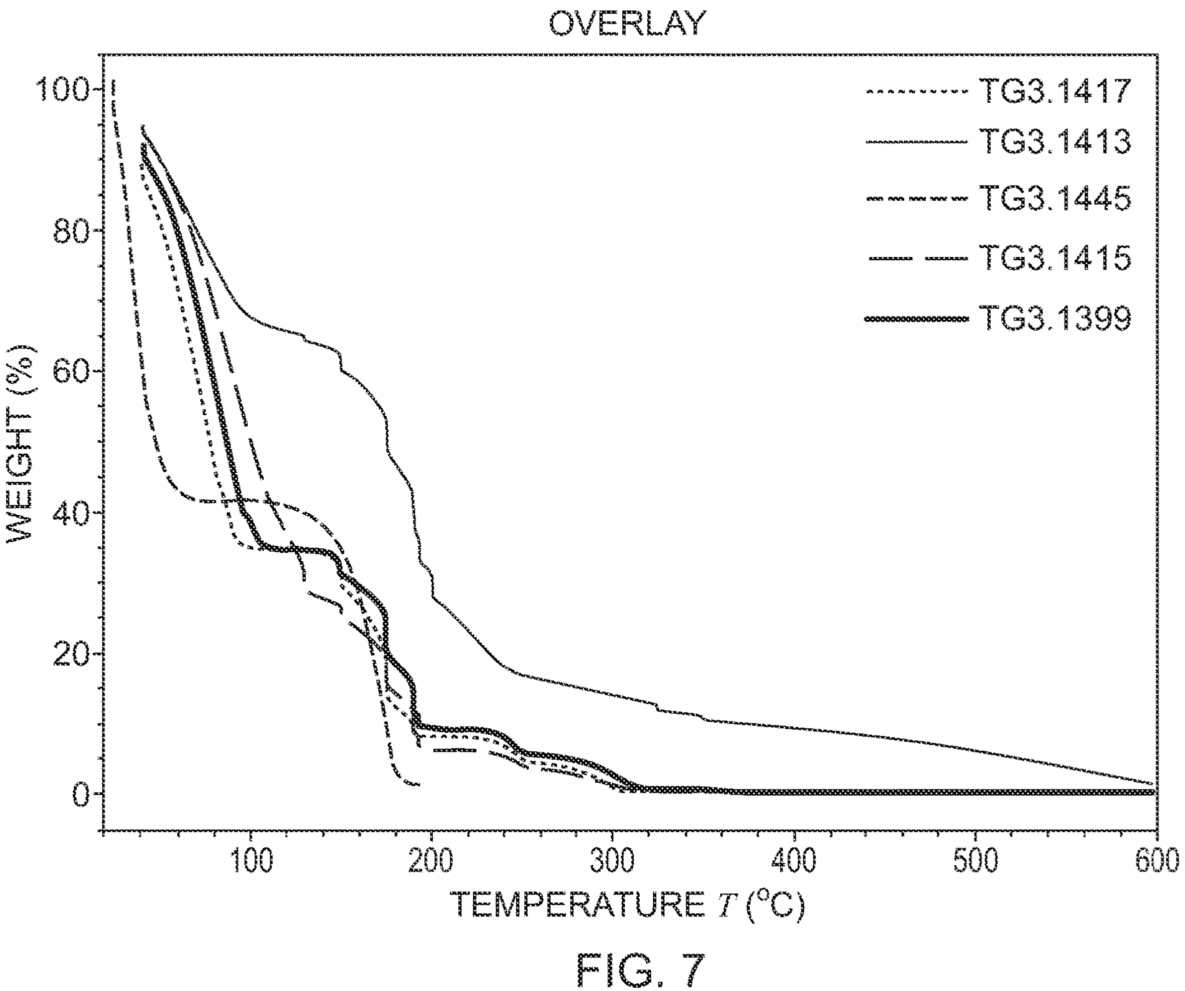
FIG. 7 is an overlay of the TGA data obtained on the five samples for comparison purposes.

FIG. 7 is an overlay of the TGA data obtained on the five samples for comparison purposes. Three of the samples containing the additive (either sucrose or ammonium acetate) track lower in weight percent as compared to the 32.50% urea liquor from approximately 160° C. to 320+° C. Although Sample 3-S-H tracks higher, the composition of the mass is not known versus the control Sample 1.

Figure 8:
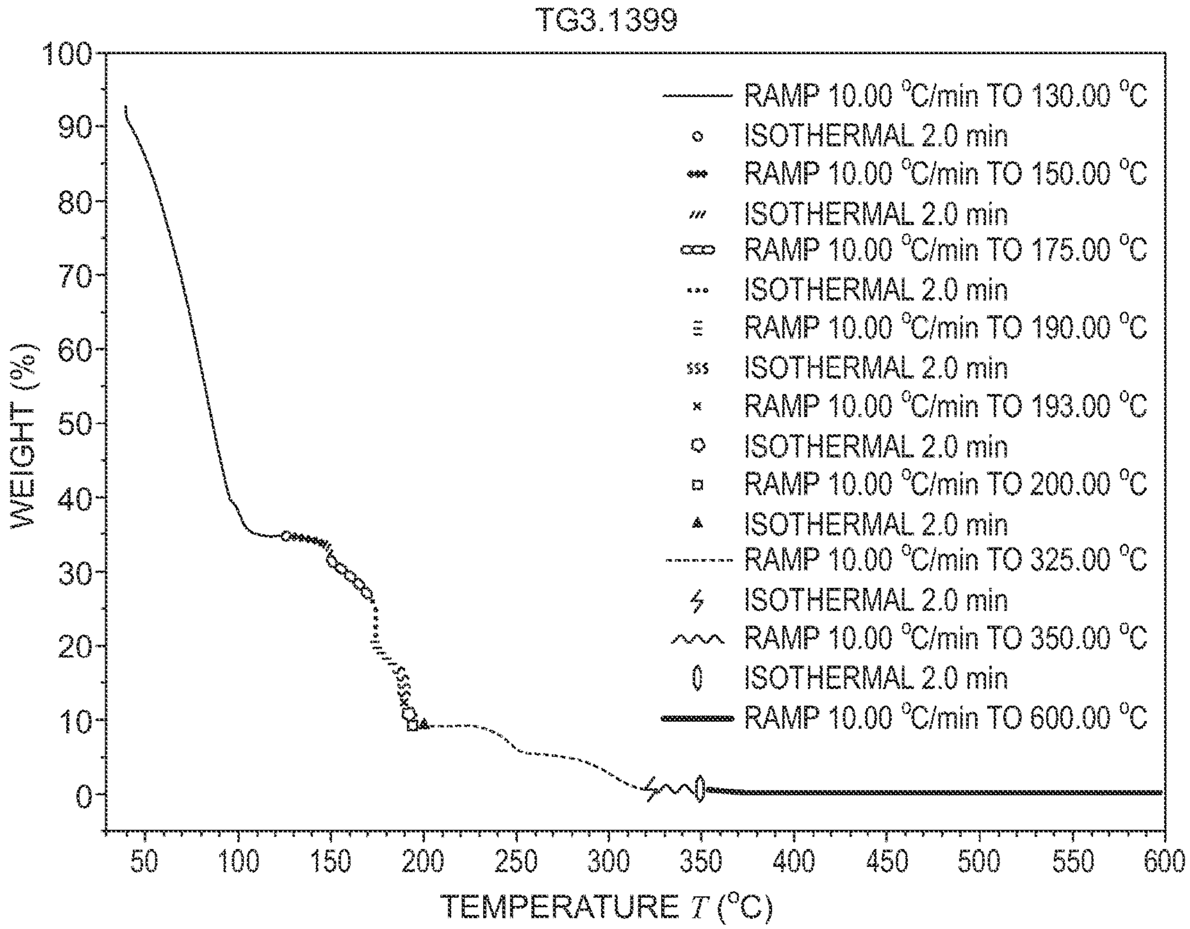
FIG. 8 is a graph of the TGA data for control Sample 1 with details about the temperature ramp and isothermal holds.

FIG. 8 is a graph of the TGA data for the control Sample 1 with details about the temperature ramp and isothermal holds. The purpose is to compare to the samples with additives to this control sample and potentially detect any increase rates of weight loss. A higher rate of weight loss was realized at 150, 175, 190, and 250° C.

Figure 9:
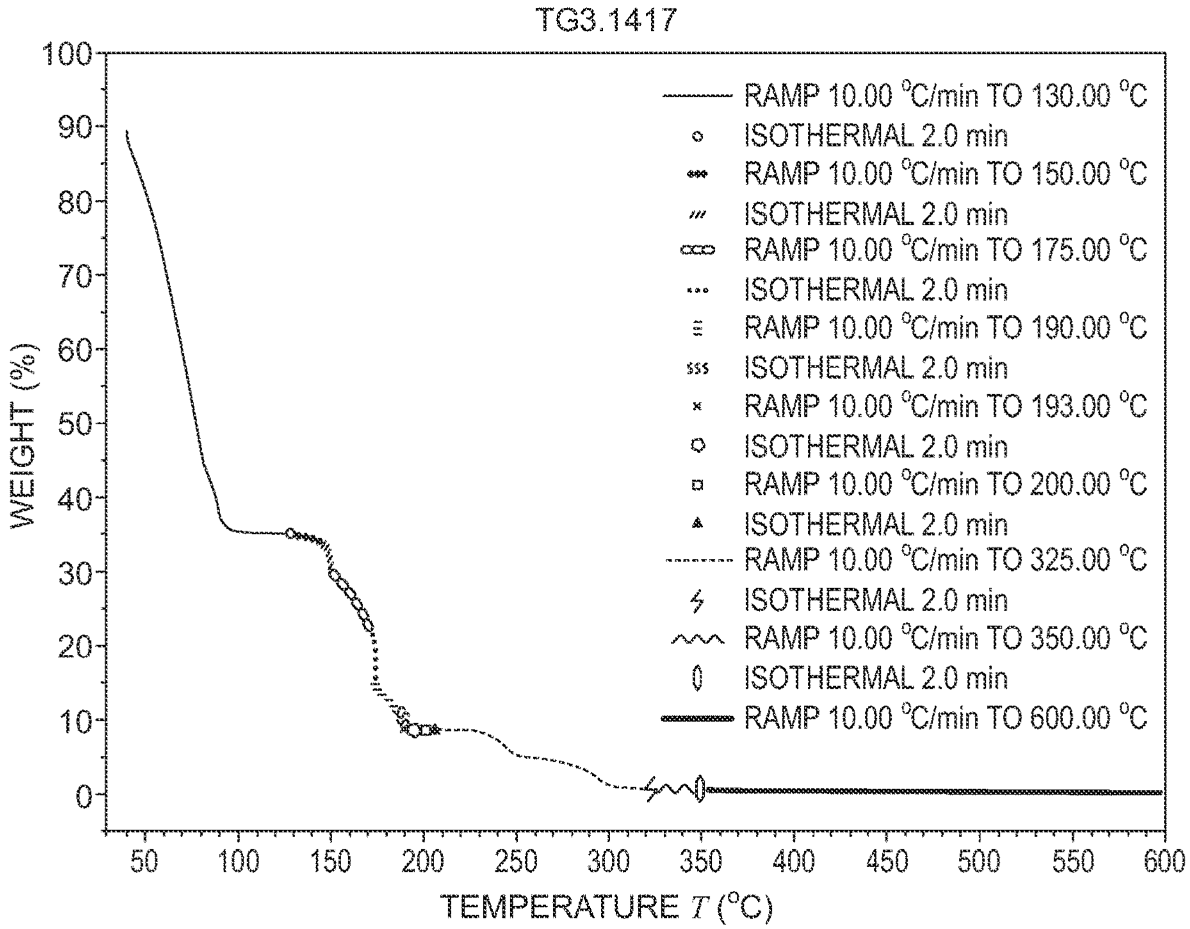
FIG. 9 is a graph of the TGA data for Sample 2-S-L with details about the temperature ramp and isothermal holds.

FIG. 9 is a graph of the TGA data for Sample 2-S-L with details about the temperature ramp and isothermal holds. The curve is similar to the curve for the control, but with less weight.

Figure 10:
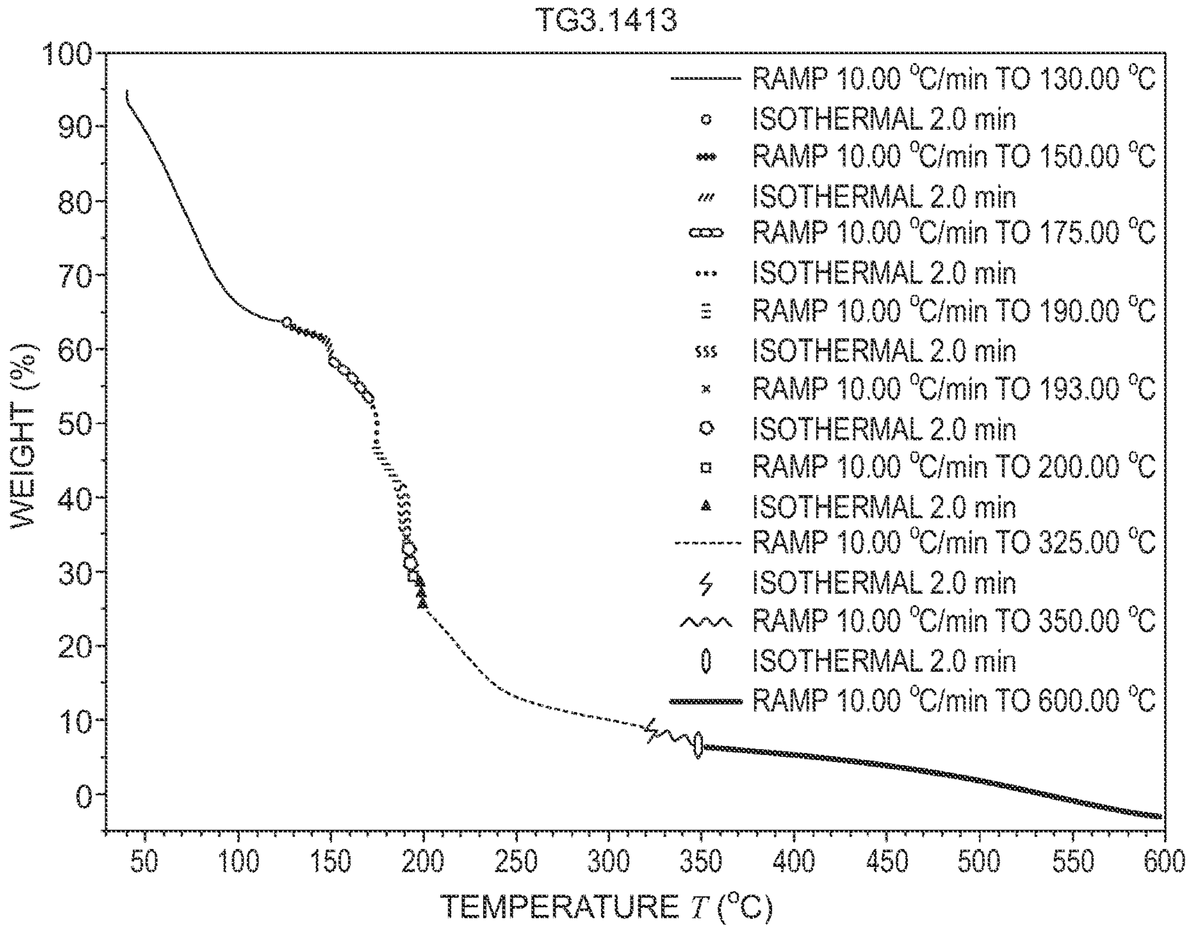
FIG. 10 is a graph of the TGA data for Sample 3-S-H with details about the temperature ramp and isothermal holds.

FIG. 10 is a graph of the TGA data for Sample 3-S-H with details about the temperature ramp and isothermal holds. The curve is similar to the curve for the control, but with higher mass. A higher rate of weight percent loss is noted at 200 to 240° C. The composition of the residue at various temperatures versus the control were not identified in this test method.

Figure 11:
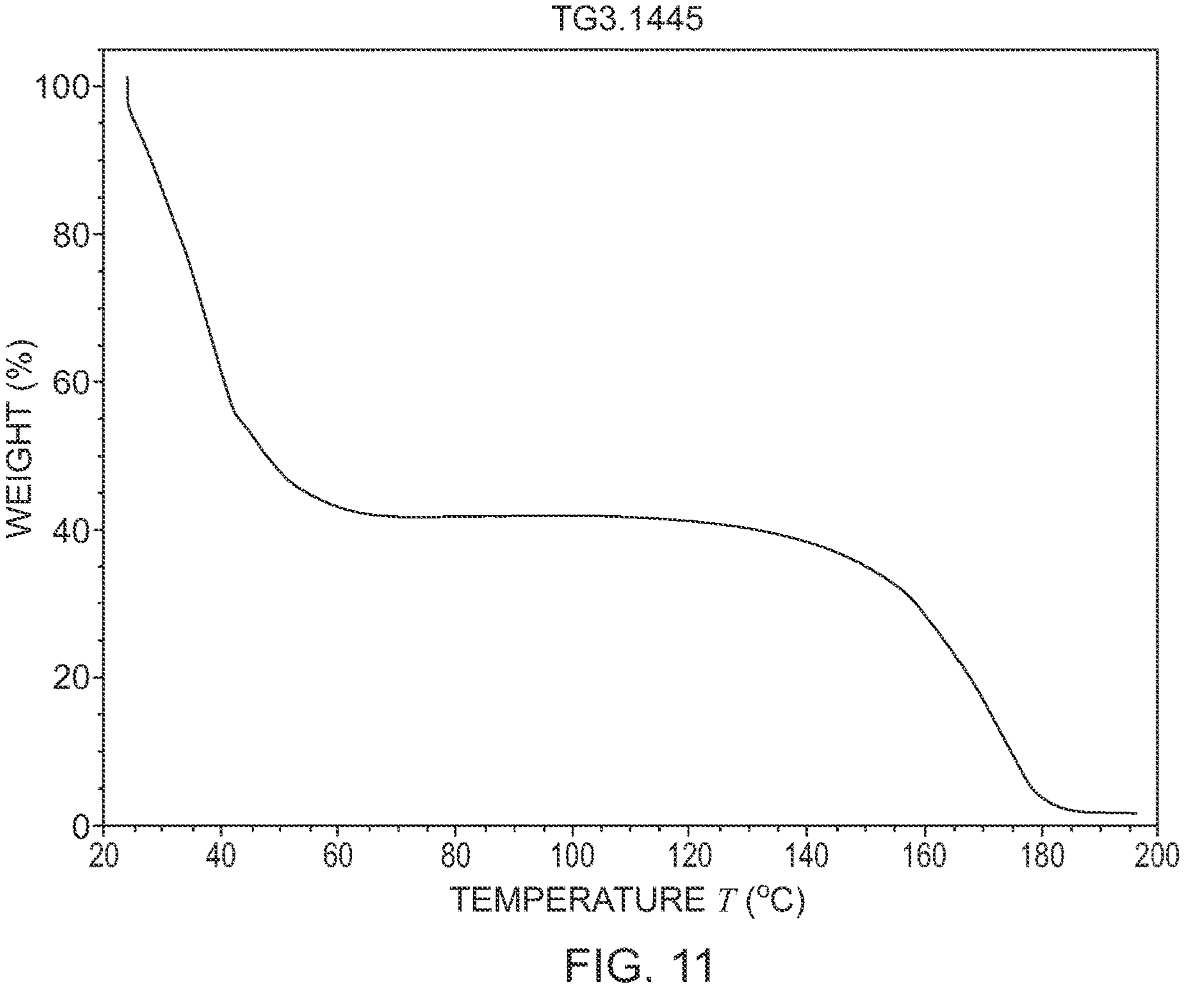
FIG. 11 is a graph of the TGA data for Sample 4-A-L.

FIG. 11 is a graph of the TGA data for Sample 4-A-L. These data were generated using an alternate method of starting at near 20° C. to near 200° C. At approximately 150° C., there is a significant weight percent loss to near zero weight at 190° C.

Figure 12:
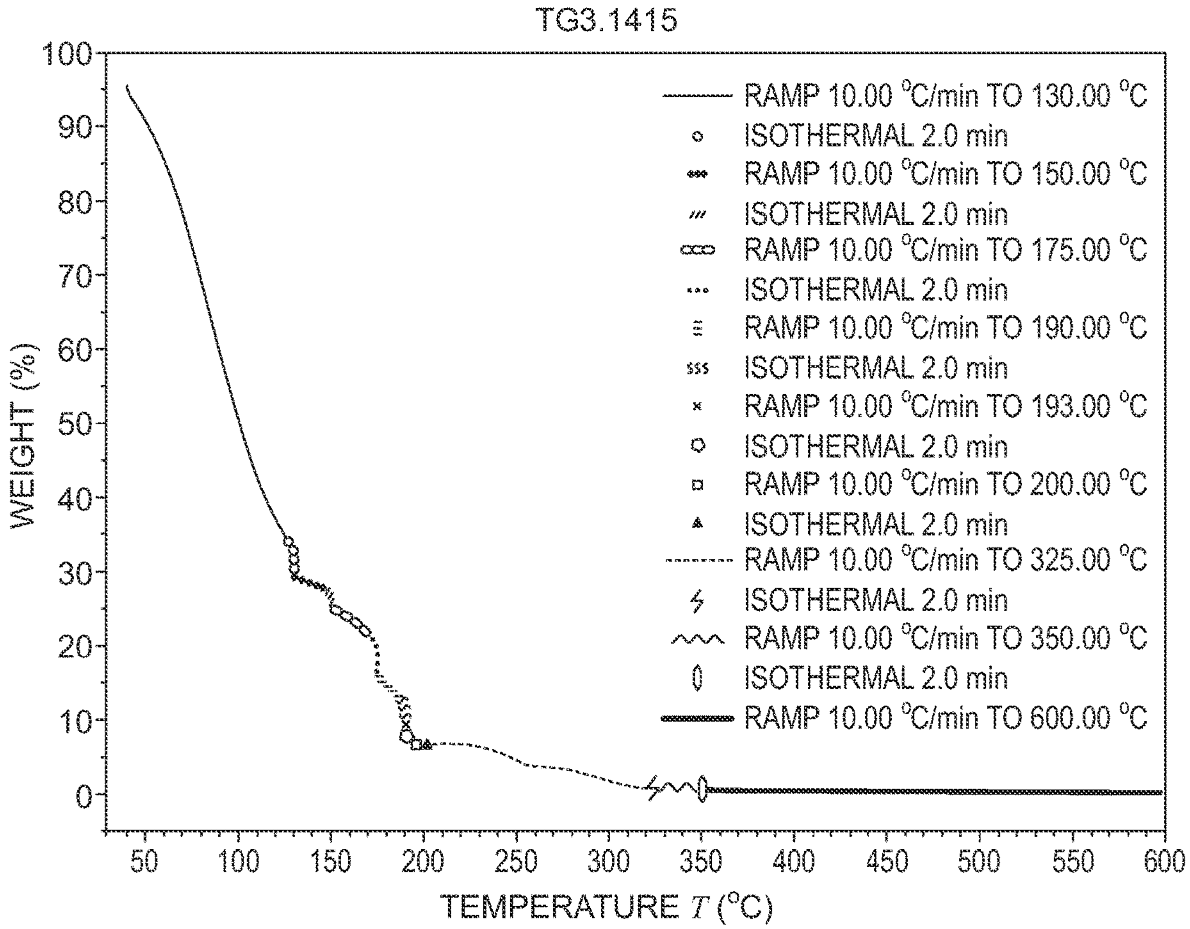
FIG. 12 is a graph of the TGA data for Sample 5-A-H with details about the temperature ramp and isothermal holds.

FIG. 12 is a graph of the TGA data for Sample 5-A-H with details about the temperature ramp and isothermal holds. The rate percent of weight loss is greater than the control starting at 130° C. versus the control at 150° C. The overall curve shows less weight percent than the control.

Based on the results of these tests, both additives (sucrose and ammonium acetate) when added to the DEF 32.5% urea liquor at the listed concentrations, affected the weight percent mass loss versus temperature favorably to reduce the deposits resulting from urea decomposition, for example at the lower idling temperatures in a diesel exhaust system.

For the 3-S-H sample, even though the overall mass tracks higher than the urea control sample, it is evident that the mass of the urea decomposition residues that contribute to "blocking issues" are reduced. The mass is higher because compounds are created by the caramelization of sugar rather than the urea. The sucrose decomposition products should not contribute to a urea-based blockage in an actual exhaust system.

In conclusion, the decomposition of the additives releases water at the elevated temperatures altering the decomposition mechanism reactions of the urea, increasing the weight loss or decomposition of the urea, as well as changing the composition of the residues that are formed. In addition, the additives appear to provide some beneficial "interference" or additional reactions for the decomposition mechanisms of urea beginning at approximately 150° C. as compared to decomposition of urea only.

Although illustrated and described above with reference to certain specific embodiments and examples, the present disclosure is nevertheless not intended to be limited to the details shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader ranges.

What is claimed:

1. A diesel exhaust fluid (DEF) for reducing nitrogen oxides in diesel exhaust streams while also reducing the deposition of urea and/or urea decomposition compounds in diesel exhaust systems of engines that use DEF and require selective catalytic reduction, the DEF comprising:

about 15 wt. % to about 40 wt % urea;

substantially purified water; and a compound additive that generates water in the diesel exhaust streams at temperatures greater than 100° C., interferes with competing reactions that would otherwise prevent decomposition of urea or produce undesired decomposition deposit compounds including biuret, cyanuric acid, ammelide, ammeline, and melamine, or both generates water and interferes with the competing reactions, wherein the compound additive is a sugar.

2. The DEF according to claim 1, wherein the compound additive is sucrose.

3. The DEF according to claim 2, wherein the urea is about 32.5 wt % and the sucrose is from about 0.02 to about 10.00 wt %.

4. A method for reducing nitrogen oxides in diesel exhaust streams while also reducing the deposition of urea and/or urea decomposition compounds in diesel exhaust systems of engines that use diesel exhaust fluid (DEF) and require selective catalytic reduction (SCR), the method comprising:

providing a DEF having (a) about 15 wt. % to about 40 wt % urea, (b) substantially purified water, and (c) a compound additive that generates water in the diesel exhaust streams at temperatures greater than 100° C., interferes with competing reactions that would otherwise prevent decomposition of urea or produce undesired decomposition deposit compounds including biuret, cyanuric acid, ammelide, ammeline, and melamine, or both generates water and interferes with the competing reactions, wherein the compound additive is a sugar; and introducing the DEF into a diesel exhaust system such that the DEF reacts with nitrogen oxides on the surface of a SCR catalyst while also reducing the deposition of urea and/or urea decomposition compounds in the diesel exhaust system.

5. The method according to claim 4, wherein the sugar is sucrose.

6. The method according to claim 5, wherein the urea is about 32.5 wt % and the sucrose is from about 0.02 to about 10.00 wt %.

7. A system for reducing nitrogen oxides in diesel exhaust streams while also reducing the deposition of urea and/or urea decomposition compounds in diesel exhaust systems of engines that use diesel exhaust fluid (DEF) and require selective catalytic reduction (SCR), the system comprising:

a DEF having (a) about 15 wt. % to about 40 wt % urea, (b) substantially purified water, and (c) a compound additive that generates water in the diesel exhaust streams at temperatures greater than 100° C., interferes with competing reactions that would otherwise prevent decomposition of urea or produce undesired decomposition deposit compounds including biuret, cyanuric acid, ammelide, ammeline, and melamine, or both generates water and interferes with the competing reactions, wherein the compound additive is a sugar;

a storage vessel containing the DEF;

a SCR catalyst positioned within the diesel exhaust unit and having a surface; and a delivery tube connecting the storage vessel to the diesel exhaust unit and delivering the DEF from the storage vessel to the diesel exhaust unit onto or near the surface of the SCR catalyst.

8. The system according to claim 7, wherein the sugar is sucrose.

9. The system according to claim 8, wherein the urea is about 32.5 wt % and the sucrose is from about 0.02 to about 10.00 wt %.

* * * * *